United States Patent [19]

Carter

[11] Patent Number: 4,562,635
[45] Date of Patent: Jan. 7, 1986

[54] METHOD FOR INSTALLING AN AUTOMATIC VEHICLE GUIDE PATH IN WOOD BLOCK FLOORS

[75] Inventor: Ronald P. Carter, East Peoria, Ill.

[73] Assignee: AGVS Installations, Inc., Peoria, Ill.

[21] Appl. No.: 636,352

[22] Filed: Jul. 31, 1984

[51] Int. Cl.⁴ .............................................. B23P 11/00
[52] U.S. Cl. ......................................... 29/432; 29/451; 29/460; 29/526 R; 52/221; 52/741; 156/293; 174/48; 174/98; 405/157
[58] Field of Search ...................... 29/428, 460, 526 R, 29/450, 451, 432; 52/221, 287, 290, 741, 743; 405/154, 157, 179, 174; 174/48, 49, 96, 98; 404/47, 67, 68

[56] References Cited

U.S. PATENT DOCUMENTS

| | | | |
|---|---|---|---|
| 2,773,512 | 12/1956 | Burk | 405/154 |
| 3,335,647 | 8/1967 | Thorp, Jr. | 404/47 X |
| 3,473,339 | 10/1969 | Schlafly, Jr. | 405/157 |
| 3,713,947 | 1/1973 | Hawkens | 174/98 UX |
| 3,798,743 | 3/1974 | Griswold | 29/428 |
| 3,818,659 | 6/1974 | Anderson | 52/287 X |
| 3,862,479 | 1/1975 | Laderoute | 29/155 R |
| 4,030,259 | 6/1977 | Meckler | 52/741 X |
| 4,250,675 | 2/1981 | Meckler | 52/741 X |
| 4,332,429 | 6/1982 | Frick et al. | 174/48 X |
| 4,341,007 | 7/1982 | Kruszona | 29/451 |

Primary Examiner—Charlie T. Moon
Attorney, Agent, or Firm—Hill, Van Santen, Steadman & Simpson

[57] ABSTRACT

A method for installing a guide path for an automatic guided vehicle system in a wood block floor includes the step of cutting a slot in the floor corresponding to the system layout, inserting a guide bar in the slot, fastening the guide bar to the sub-floor, inserting one or more signal wires in a slot within the guide bar, applying a mechanical seal in the guide bar slot above the signal wires to enclose the signal wires in "free floating" fashion, and covering the mechanically sealed guide bar containing the signal wires with a filler and sealer so as to be flush with the remainder of the wood block floor. The signal wires are retained in the desired pattern without being completely embedded within the floor and stresses caused by shifting of the wood block floor are not transmitted to the wires.

7 Claims, 4 Drawing Figures

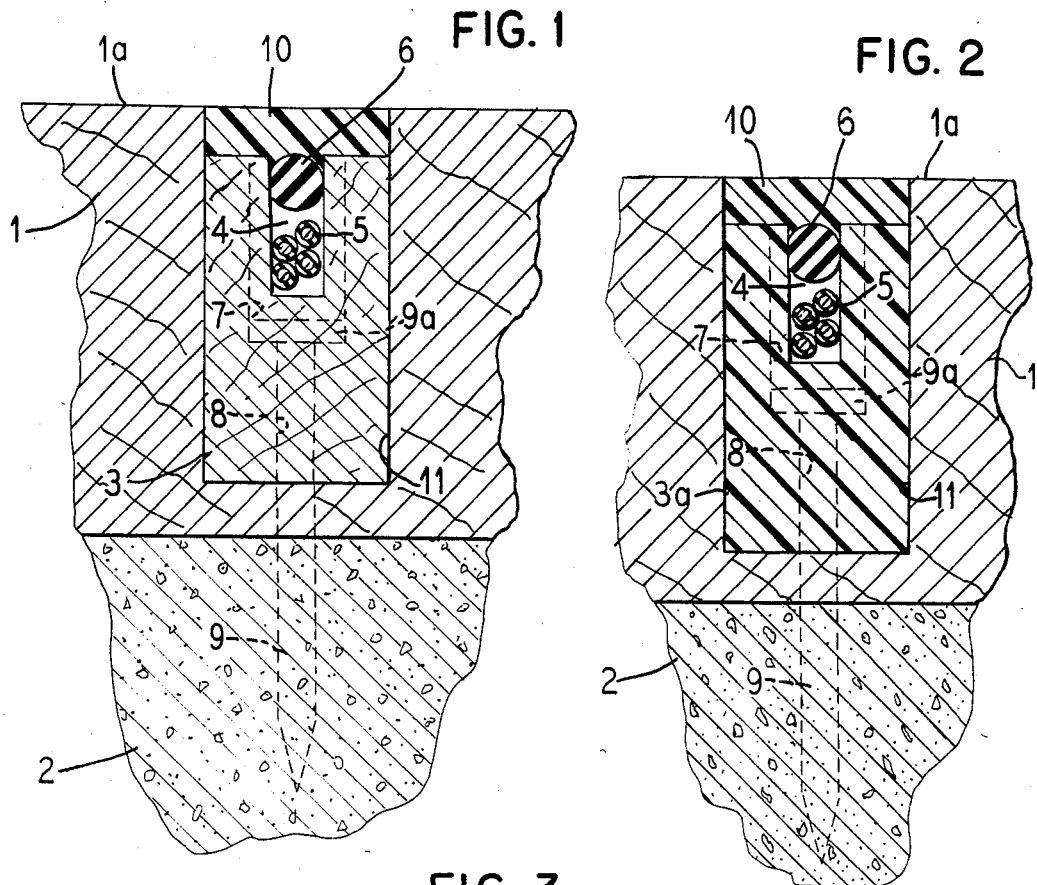
FIG. 1
FIG. 2
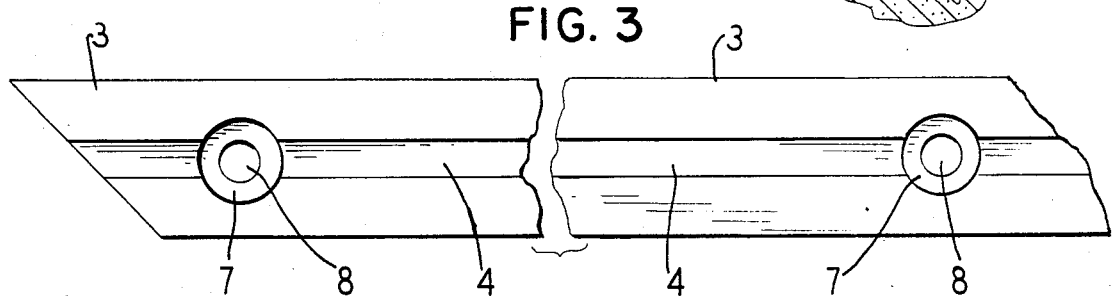
FIG. 3
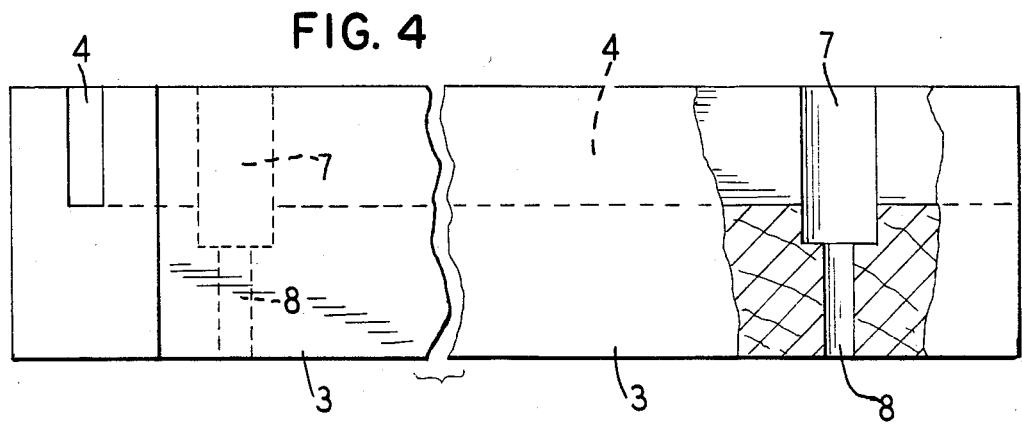
FIG. 4

METHOD FOR INSTALLING AN AUTOMATIC VEHICLE GUIDE PATH IN WOOD BLOCK FLOORS

BACKGROUND OF THE INVENTION

1. Field of the Invention

The present invention relates to methods for installing a guide path for an automatic guided vehicle system, and in particular to a method for installing such a guide path having an inductive loop disposed beneath a wood block floor.

2. Description of the Prior Art

Automatic vehicle guidance systems, so-called "driverless" systems, are known which utilize an inductive loop embedded in the floor of the facility in which the system is to be used. The loop in some instances may be taped to the floor of the facility. The inductive loop provides a predetermined route which vehicles will follow as they travel throughout the facility to perform a variety of functions. The guide paths must be accurately located relative to the floor plans and may include information points, intersections, bypasses, station stops and other features which may be integrated in the system design. Conventional guidance networks generally include signal wiring connected to pilot line drivers which, when energized, may generate up to five different frequencies which serve as signals which are detected by sensors disposed on the vehicles. Simpler systems may be utilized having only one signal frequency.

The latout for such vehicle guidance systems may range from simple to very complex depending upon the requirements of the customer. Most systems are in the category of complex systems wherein several load or unload positions, several vehicles, several information points, and integration with other systems are required. The guide path thus also becomes an information network permitting the vehicles and a control computer to communicate with each other via the network sensors and information points. It is essential that all of the systems interfaces within the guide path are installed properly to have an effective trouble-free operating system.

The vehicles utilized in such systems vary in size, capacity and functions. The vehicles also vary in the manner of design and placement of the drive and steering wheels of the vehicle, causing a variety of guide path conditions to be encountered. When two different types of vehicles must operate in the same system, it will be necessary to have two guide paths which may overlap and operate at different signal frequencies. These conditions will affect the turning radii of the vehicles, the entering or leaving of a transaction station by a vehicle, and locations of the sensors with respect to the guide path. Much of this detail may be included by the engineering group providing the system equipment, however, the installer or installation crew must be knowledgeable with respect to the overall system parameters for incorporating the desired functions into the actual floor plan.

The generally accepted conventional method of installing signal wire or guide wire by imbedding the wire in the floor is as follows. A floor plan is first laid out according to the design detials for metting the user's requirements. Floor slots are cut, normally in a concrete floor to the depth and width specified including curves, turns and bypasses according to the previously made floor layout. The signal wires are placed in the floor slots according to the wiring diagram and are tested for continuity. The floor slots are backfilled with one of several commercially available concrete grouting compounds which are poured or troweled or gunned into the slots. The material when applied is usually wet and is forced into the slots by some means so as to completely surround the wires in the slots. The grouting material is then troweled so as to be even with the floor surface, and is permitted to cure for a period of three to four hours. Care must be taken to apply the grouting product in a manner which allows for a certain degree of shrinkage during curing, and material must be added or removed as required in order to achieve a finished installation which is flush with the floor surface. The objective is to achieve a smooth surface with no depressions or voids, and no raised or rounded areas, on the guide path or along the return cuts.

A similar procedure is followed for installing a guide path for an automatic guided vehicle system in a wood block floor. Wood block floors are generally constructed of approximately 4 inch by 6 inch wooden blocks, with a nominal thickness of $2\frac{1}{4}$ inches parallel with the grain. The blocks are treated with Creosote and are normally installed over a sub-floor of concrete using pitch as an adhesive to hold the blocks in place. In some instances a coating of pitch may be used on the surface of the block floor. Due to the construction and composition of such wood block floors, the floors tend to move or shift due to humidity, other moisture, equipment traffic, and other forces encountered on a day-to-day basis. Because of such movement, conventional methods of installing guide paths for guided vehicle systems in facilities having wood block floors require removal of the wood blocks in a path of sufficient width to accommodate the vehicle along the complete length of the guide path. Light weight concrete is substituted for the removed blocks and the concrete path is then cut and wired as described above. The foregoing is a very expensive process and for that reason is seldom used.

Whether installed in a floor consisting completely of concrete or in a concrete path within a wood block floor, conventional installation methods for automatic vehicle system guide paths result in the guide path wires essentially becoming an integral part of the floor, once the grout is fully cured. The grout material in conventional installation methods hardens almost as hard as the surrounding concrete. Concrete floors, like wood block floors, are subject to expansion, contraction, settling and other deterioration over a period of time. Moreover, in industrial plants where machinery is in operation, other forces such as vibration, shock loading, heavy load carrying vehicles, and the like will be encountered which adds stresses or strains to the guide path areas. These forces and external disruptions make the embedded signal wires subject to breakage or separation which requires repairs to be made and interruption of the system during such repairs. Such repair of conventional installations requires extreme care and hand chiseling in order to gain access to the embedded wires once the trouble area is identified. This is a difficult and time consuming process. The same procedure is necessary if the system is to be expanded or changed in the future.

SUMMARY OF THE INVENTION

It is an object of the present invention to provide a method for installing a guide path for an automatic guided vehicle system in a wood block floor which does not require the removal of wood blocks and the replacement thereof by concrete.

It is a further object of the present invention to provide such an installation method which includes a means of wire containment in the form of a mechanical seal directly above the signal wire or wires at a fixed depth below the floor surface.

A further object of the present invention is to provide such a method for installation which permits relatively easy access to the signal wire or wires, even after the slot has been sealed, and the system has been in use for some time.

The above objects are achieved in an installation method which includes the following steps. A floor layout is established to meet the user's requirements. The wood block floor is cut using electrically powered sawing equipment fitted with carbide saw and chipper blades. The cut is made approximately 1 inch wide and 2 inches in depth and runs the entire length of the guide path and return cuts. A guide bar is inserted into the slot in the wood block floor. The guide bar may be comprised of plastic, wood or composition material in accordance with the requirments of the particular installation. The guide bar is fastened directly to the concrete sub-floor beneath the wood block floor utilizing ram set or other suitable fasteners or bolts. The guide bar, normally manufactured of straight stock, can be curved to follow the floor layout by kerfing the guide bar if it is comprised of wood, or heating the guide bar if it is made of plastic or composition material.

The guide bar itself has a longitudinal slot therein into which signal wires are placed in "free floating" fashion after the guide bar is installed in the floor slot and anchored therein. By anchoring the guide bar to the concrete sub-floor, the wires retained in the guide bar are protected from shearing action caused by movement or shifting of the wood blocks. Additionally, because the wires are not embedded in the floor, access to the wires can be relatively easily gained for repair or maintenance.

After the wires are placed within the slot in the guide bar, a mechanical seal is inserted into the guide bar to mechanically close the slot with the wires retained therein to hold the wires in place and protect them from dirt or foreign material. At this point the entire system can be checked by actually running a guided vehicle through this system to confirm proper operation thereof before finally sealing the guide bar and the wires therein.

If the system passes the operational tests, the remaining volume of the slot in the wood block floor above the now-sealed guide bar is vacuumed and the slot is sealed using pitch, urethane, plastic or other suitable material.

DESCRIPTION OF THE DRAWINGS

FIG. 1 is a sectional view of a guide path for an automatic guided vehicle system installed in a wood block floor in accordance with the principles of the method disclosed herein.

FIG. 2 is a sectional view of a further embodiment of a guide path for a vehicle system installed in a wood block floor in accordance with the principles of the method disclosed herein.

FIG. 3 is a plan view of a guide bar for use in the automatic guided vehicle system guide path installed in accordance with the principles of the method disclosed herein.

FIG. 4 is a side view, partly in section, of the guide bar shown in FIG. 3.

DESCRIPTION OF THE PREFERRED EMBODIMENTS

A sectional view of a first embodiment of a guide path for an automatic guided vehicle system installed in accordance with the method disclosed and claimed herein is shown in FIG. 1. The guide path is installed in a wood block floor 1 having an upper surface 1a. The wood block floor 1 is supported by a concrete sub-floor 2. In accordance with the principles of the present method, a slot or trough 11 is cut by suitable sawing equipment in the wood block floor 1. Although the floor 1 is comprised of wood, a suitable electrically powered saw for cutting the slot 11 is a 400 mm medium-duty self-powered concrete saw of the type manufactured and distributed by AB Sag- & Betonborrning, Tagenvagen 1, 422 47 Hisings Backa, Goteborg, Sweden. A guide bar 3, which in the embodiment of FIG. 1 is also comprised of wood, is inserted in the slot 11. The guide bar 3 has a slot 4 therein. A plurality of holes 7 are drilled periodically along the length of the guide bar 3, as best seen in FIGS. 3 and 4. The holes 7 do not extend entirely through the guide bar 3, and another hole 8, of smaller diameter than the hole 7, is drilled at the bottom of each hole 7 extending through the bottom of the guide bar 3. The guide bar 3 is anchored in the floor 1 by a suitable fastener 9 having a head 9a which rests on the bottom of the hole 7. The fastener 9 extends completely through the guide bar 3 and into the concrete sub-floor 2. The fastener 9 may be inserted utilizing a ram set.

After the guide bar 3 has been anchored in the floor 1, one or more signal wires 5 are arranged in the slot 4 in the guide bar 3 in "free floating" fashion, that is, without the use of any compound or material in which the wires 5 are embedded. The upper opening of the slot 4 is then closed by a mechanical seal 6, which may be comprised of foam plastic or any other suitable slightly resilient and flexible material. The mechanical seal 6 may be applied by a tool as described in the co-pending application of Wesley R. Bantz, Ser. No. 636,330 filed simultaneously herewith and assigned to the same assignee as is the present subject matter. The teachings of that application Ser. No. 636,330, are incorporated herein by reference. The tool described therein for inserting the mechanical seal 6 insures that the mechanical seal 6 will be placed at a uniform depth below the upper surface 1a of the floor throughout the system.

At this point, the system may be tested utilizing an actual vehicle. Assuming the system passes the operational test, final sealing of the guide path is undertaken by filling the remaining volume of the slot 11 not occupied by the guide bar 3 with suitable filling and sealing material, such as pitch, urethane, plastic, or other materials well known to those skilled in the art. The sealer material 10 is applied in an amount and is subsequently smoothed so as to be flush with the upper surface 1a.

A further embodiment of the guide bar is shown in FIG. 2, the guide bar 3a in this embodiment being comprised of plastic. All other reference numerals identify identical elements as in FIG. 1. The guide bar may also be comprised of composition material.

As stated above, the slot 11 is preferably approximately 1 inch wide and 2 inches in depth and follows the entire length of the guide path and return cuts.

As shown in FIG. 3, the guide bar 3 is generally comprised of straight stock. In order to accommodate the curves and turns of the system layout, the guide bar 3, if comprised of wood, can be suitably kerfed. In the embodiment of FIG. 3, the guide bar 3a can be heated and deformed so as to follow the layout.

Although modifications and changes may be suggested by those skilled in the art it is the intention of the inventor to embody within the patent warranted hereon all changes and modifications as reasonably and properly come within the scope of his contribution to the art.

I claim as my invention;

1. A method for installing at least one wire in a wood block floor in a selected pattern comprising the steps of:
    cutting a slot in said wood block floor corresponding to said
        selected pattern;
    inserting a guide bar having an exposed slot therein in said slot in said wood block floor such that a volume of said slot in said wood block floor remains above said guide bar after insertion in said wood block floor slot;
    anchoring said guide bar in said slot in said wood block floor;
    inserting the wire in said slot in said guide bar;
    inserting a mechanical seal in said slot in said guide bar above said wire so as to be substantially flush with an upper surface of said guide bar;
    filling said volume of said slot in said wood block floor
        above said guide bar with sealer material; and
    smoothing said sealer material flush with said wood block floor.

2. A method for installing as claimed in claim 1 wherein the step of inserting a mechanical seal is further defined by inserting a continuous strand of resilient material in said slot in said guide bar above said wire.

3. A method for installing as claimed in claim 1 wherein said wood block floor is supported on a concrete sub-floor, and wherein the step of anchoring said guide bar is further defined by anchoring said guide bar in said slot in said wood block floor by fastening said guide bar through said wood block floor to said concrete sub-floor.

4. A method for installing as claimed in claim 1 wherein said selected pattern includes at least one curve and wherein said guide bar is comprised of wood, said method comprising the additional step of kerfing said guide bar for fitting said guide bar in said curve.

5. A method for installing as claimed in claim 1 wherein said selected pattern includes at least one curve and wherein said guide bar is comprised of plastic, said method comprising the additional step of heating said plastic for deforming said plastic, for fitting said guide bar in said curve.

6. A method for installing a guide path for an automatic guided vehicle system in a selected pattern in a wood block floor comprising the steps of:
    cutting a slot in said wood block floor corresponding to said
        selected pattern;
    inserting a guide bar having a slot in said slot in said wood block floor such that a volume of said slot in said wood block floor remains above an upper surface of said guide bar;
    anchoring said guide bar in said slot in said wood block floor;
    inserting at least one signal wire in said slot in said guide bar;
    inserting a mechanical seal above said signal wire in said slot in said guide bar such that said mechanical seal is substantially flush with said upper surface of said guide bar;
    filling said remaining volume of said slot in said wood block floor above said guide bar with sealer material; and
    smoothing said sealer material so as to be substantially flush with said wood block floor.

7. A method for installing as claimed in claim 6 wherein said wood block floor is supported on a concrete sub-floor and wherein the step of anchoring said guide bar in said slot in said wood block floor is further defined by anchoring said guide bar in said wood block floor with a fastener extending through said guide bar, said wood block floor and into said concrete sub-floor.

* * * * *